(12) United States Patent
Ji et al.

(10) Patent No.: US 10,733,760 B2
(45) Date of Patent: *Aug. 4, 2020

(54) MULTISCALE WEIGHTED MATCHING AND SENSOR FUSION FOR DYNAMIC VISION SENSOR TRACKING

(71) Applicant: Samsung Electronics Co., Ltd., Suwon-si, Gyeonggi-do (KR)

(72) Inventors: Zhengping Ji, Temple City, CA (US); Lilong Shi, Austin, TX (US); Yibing Michelle Wang, Temple City, CA (US); Hyun Surk Ryu, Suwon-si (KR); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,846

(22) Filed: Oct. 9, 2019

(65) Prior Publication Data
US 2020/0043196 A1 Feb. 6, 2020

Related U.S. Application Data

(63) Continuation of application No. 15/458,016, filed on Mar. 13, 2017, now Pat. No. 10,510,160.
(Continued)

(51) Int. Cl.
*G06K 9/00* (2006.01)
*G06T 7/73* (2017.01)

(52) U.S. Cl.
CPC ...... *G06T 7/74* (2017.01); *G06T 2207/10028* (2013.01); *G06T 2207/30244* (2013.01)

(58) Field of Classification Search
None
See application file for complete search history.

(56) References Cited

U.S. PATENT DOCUMENTS

2007/0122001 A1* 5/2007 Wang ............... G06K 9/00208
382/103
2014/0320706 A1 10/2014 Shin et al.
(Continued)

OTHER PUBLICATIONS

Delbruck, T. et al, "Integration of dynamic vision sensor with inertial measurement unit for electronically stabilized event based vision," 2014 IEEE International Symposium on Circuits and Systems (ISCAS), Jun. 5, 2014.
(Continued)

*Primary Examiner* — Sean M Conner
(74) *Attorney, Agent, or Firm* — Renaissance IP Law Group LLP (57) ABSTRACT

A Dynamic Vision Sensor (DVS) pose-estimation system includes a DVS, a transformation estimator, an inertial measurement unit (IMU) and a camera-pose estimator based on sensor fusion. The DVS detects DVS events and shapes frames based on a number of accumulated DVS events. The transformation estimator estimates a 3D transformation of the DVS camera based on an estimated depth and matches confidence-level values within a camera-projection model such that at least one of a plurality of DVS events detected during a first frame corresponds to a DVS event detected during a second subsequent frame. The IMU detects inertial movements of the DVS with respect to world coordinates between the first and second frames. The camera-pose estimator combines information from a change in a pose of the camera-projection model between the first frame and the second frame based on the estimated transformation and the detected inertial movements of the DVS.

20 Claims, 4 Drawing Sheets

Related U.S. Application Data

(60) Provisional application No. 62/437,027, filed on Dec. 20, 2016.

(56) References Cited

U.S. PATENT DOCUMENTS

| | | |
|---|---|---|
| 2015/0178900 A1* | 6/2015 | Kim .................... G06T 5/50 382/154 |
| 2016/0042515 A1 | 2/2016 | Sorgi et al. |
| 2017/0124693 A1 | 5/2017 | Ramalingam et al. |

OTHER PUBLICATIONS

Final Office Action for U.S. Appl. No. 15/458,016, dated May 1, 2019.
Mueggler, Elias et al., "Event-based, 6-DOF Pose Tracking for High-Speed Maneuvers", 2014 IEEE/RSJ International Conference on Intelligent Robots and Systems, Sep. 18, 2014, 8 pages.
Notice of Allowance for U.S. Appl. No. 15/458,016, dated Jul. 17, 2019.
Office Action for U.S. Appl. No. 15/458,016, dated Nov. 30, 2018.

\* cited by examiner

MULTISCALE WEIGHTED MATCHING AND SENSOR FUSION FOR DYNAMIC VISION SENSOR TRACKING

CROSS-REFERENCE TO RELATED APPLICATION

This patent application is a continuation of U.S. patent application Ser. No. 15/458,016, filed on Mar. 13, 2017, which claims the priority benefit under 35 U.S.C. § 119(e) of U.S. Provisional Patent Application No. 62/437,027, filed on Dec. 20, 2016, the disclosure of which is incorporated herein by reference in its entirety.

TECHNICAL FIELD

The subject matter disclosed herein generally relates to Dynamic Vision Sensors (DVSs), and more particularly, to an apparatus and method to estimate the pose of a DVS.

BACKGROUND

The output of a DVS is an event-based change in camera-sensing luminance. Generally, the output of DVS is a stream of events in which each event is associated with a particular state, i.e., the event location within an image sensor array and a binary state indicating a positive or a negative change in luminance. A certain number of DVS events are sampled to form an image in which pixel locations containing one or more events are set to be non-zero and other pixel locations are all set to be zero. The value of each non-zero pixel may be determined by different techniques. For example, each non-zero pixel may be represented by a vector u that may include a timestamp, the pixel coordinates and the latest event state change, i.e., +1 for a positive change in luminance or −1 for a negative change in luminance. Alternatively, a non-zero pixel may be represented by the number of events appearing at that location, or represented by the arrival time of the latest event.

A conventional DVS is an asynchronized sensor without time integration, so DVS frames must be formed based on a certain time of sampling, or frame-integration time, so that changes between temporally adjacent frames may be compared to estimate camera movement. The major difficulties associated with DVS camera movement or tracking include: (1) the features within each DVS frame may be sparse and highly variant so feature-based image matching may be difficult (if even possible) causing movement estimation accuracy to be vulnerable; and (2) due to the lack of extraction of key features, corresponding landmarks are not available through DVS movement. Accordingly, it may be difficult to cross check a current estimation of the camera movement or pose and it may be difficult to refer landmarks to reduce sensor-movement estimation drift.

SUMMARY

An example embodiment provides a DVS pose-estimation system that may include a DVS, a 3D transformation estimator, an inertial measurement unit and a camera-pose estimator based on sensor fusion. The DVS may detect DVS events and may shape frames based on a number of DVS accumulated events. The transformation estimator may estimate a 3D transformation based on an estimated depth and the matching of confidence-level values within a camera-projection model such that at least one of a plurality of DVS events detected during a first frame corresponds to a DVS event detected during a second frame in which the second frame is subsequent to the first frame. The inertial measurement unit may detect inertial movements of the DVS with respect to world coordinates between the first and second frames. The camera-pose estimator may combine information from a change in a pose of the DVS camera between the first frame and the second frame based on the estimated transformation and the detected inertial movements of the DVS. In one embodiment, the camera-pose estimator may use the detected inertial movements of the DVS to correct the estimated change in the pose of a transformation model between the first frame and the second frame based on the estimated transformation. In one embodiment, the transformation estimator may estimate the depth and match the camera-projection model for first and second frames for a plurality of frame-integration times, and the transformation estimator may correct a first estimate in the change in camera pose between the first frame and the second frame corresponding to a first frame-integration time based on an estimate in the change in the camera pose between the first frame and the second frame corresponding to a second frame-integration time in which the first frame-integration time may be longer than the second frame-integration time. In one embodiment, the transformation estimator may estimate the transformation based on $$\arg\min \frac{1}{2} \sum_i C_{u_i} \| I_k(\pi(T_{k,k-1} \cdot \pi^{-1}(u_i, d_{u_i}))) - I_{k-1}(u_i) \|^2$$

in which i is an index, u is a detected DVS event, $C_{u_i}$ is a confidence-level value (scalar) for the DVS event $u_1$, I is a frame, k is a frame index, $\pi$ is a camera-projection model for the DVS, $\pi^{-1}$ is the inverse of the camera-projection model for the DVS, $u_i$ is a vector corresponding to the detected event $u_i$ within the camera-projection model $\pi$, $d_{u_i}$ is a (3D) depth of the DVS event $u_i$ in world coordinates, and $T_{k,k-1}$ is one of a plurality of possible vector transformations based on world coordinates between frame $I_{k-1}$ and frame $I_k$.

An example embodiment provides a method to estimate a pose of a DVS camera that may include detecting DVS events; estimating a transformation of the DVS camera based on an estimated depth of the camera and matching of confidence-level values within a camera-projection model such that at least one of a plurality of DVS events detected during a first frame corresponds to a DVS event detected during a second frame in which the second frame is subsequent to the first frame; detecting inertial movements of the DVS with respect to world coordinates between the first and second frames; and estimating a change in a pose of the camera-projection model between the first frame and the second frame based on the fusion of estimated transformation and the detected inertial movements of the DVS.

An example embodiment provides a DVS pose-estimation system that may include a DVS, a transformation estimator and a camera-pose estimator based on a multiscale temporal manner. The DVS may detect DVS events within a camera-projection model for a DVS camera. The transformation estimator may estimate a transformation of the camera based on an estimated depth and a matching of confidence-level values in camera-projection model such that at least one of a plurality of DVS events detected during a first frame corresponds to a DVS event detected during a second frame for at least two frame-integration times in which the second frame is subsequent to the first frame for each frame-integration time. The camera-pose estimator may estimate a change in a pose of the camera between the first frame and the second frame for the at least two of the plurality of frame-integration times based on the estimated transformation, in which the camera-pose estimator may further correct the estimate in the change in the pose of the camera between the first frame and the second frame for a first frame-integration time based on an estimate in the change in the pose of the camera the first frame and the second frame for a second frame-integration time in which the first frame-integration time is longer than the second frame-integration time.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein relates to a DVS pose-estimation system having an adaptive sampling time and that provides an estimation of a pose of a DVS camera that is based on a depth estimator of the camera and matching of a confidence map of temporal correlation among detected events within the camera-projection model. Based on the confidence map, weighted-image matching is performed between two frames to estimate the pose and the position of the DVS. Weighted-image matching based on the confidence map provides a greater matching accuracy over a number of frames in comparison to conventional techniques matching techniques. That is, because local features are sparse and highly variant in DVS frames, a benchmark tracking system that is based on the matching of local features is not suitable and reference to global map may be lacking, thereby resulting in estimation drift. The subject matter disclosed herein uses a multiscale temporal resolution technique to maximize the likelihood of estimated camera poses and to reduce estimation drift. To further avoid system divergence and time integration drift, an inertial measurement unit sensor may be integrated with DVS to optimize system accuracy.

The subject matter disclosed herein also provides a DVS tracking system that provides multiscale weighted matching between frames and sensor fusion for DVS camera tracking. In one embodiment, a multiscale image matching technique is used to reduce DVS pose-estimation error that may be caused by high feature/event variations across DVS frames. IMU sensor data may be incorporated into the DVS pose estimation to avoid system divergence, reduce time integration drifting, and optimize tracking accuracies.

In one embodiment, the weighted image matching technique based on image representation of a confidence map leads to a higher matching accuracy that provides better DVS image recognition and DVS Simultaneous Localization and Mapping (SLAM). Additionally, the multiscale image matching technique provides a reduction in DVS pose-estimation error. Fusion of the DVS pose-estimation system with an IMU sensor may further avoid system divergence, reduce time-integration drifting, and optimize tracking accuracies.

Figure 1:
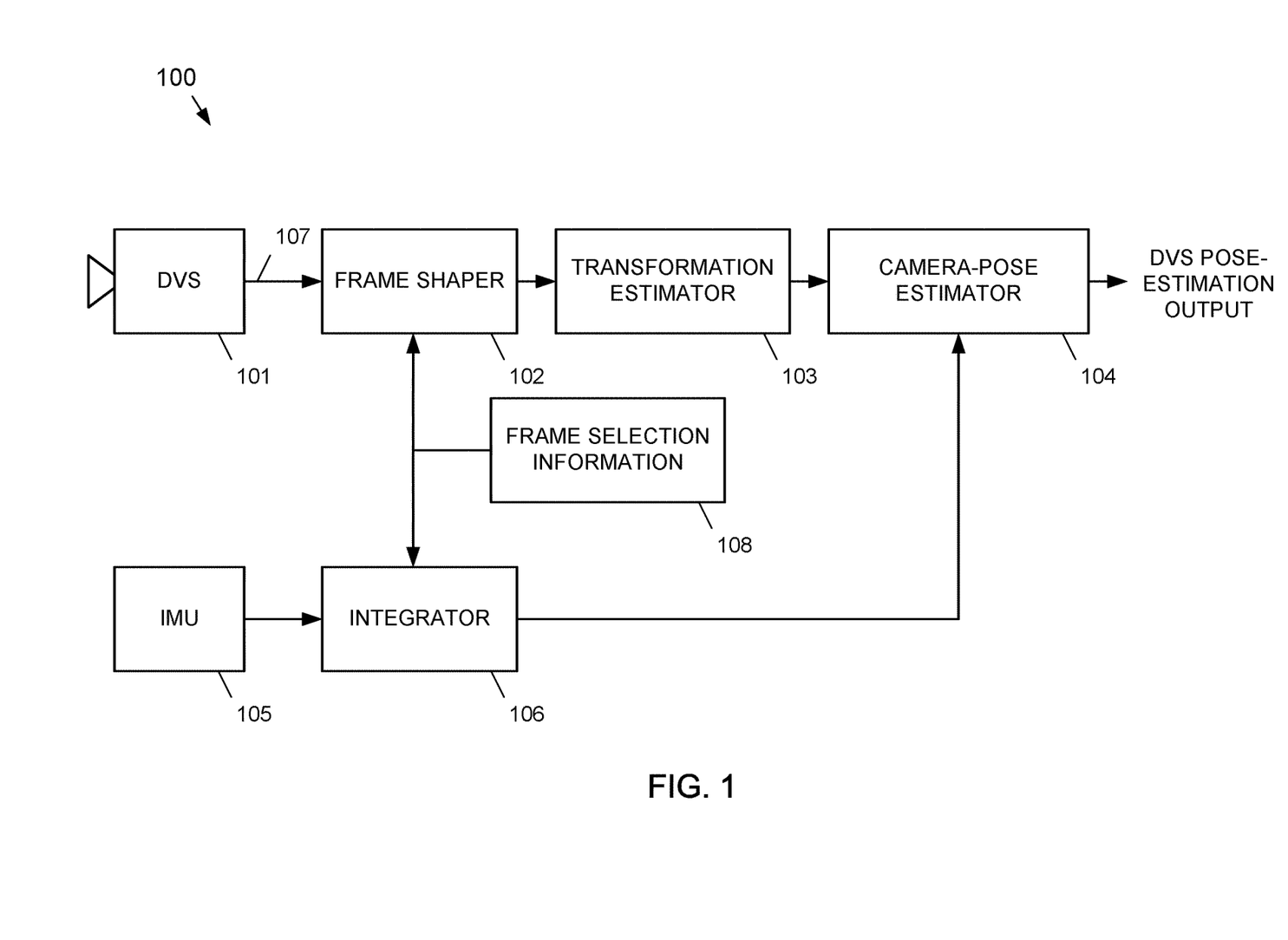
FIG. 1 depicts a block diagram of a DVS pose-estimation system according to the subject matter disclosed herein.

FIG. 1 depicts a block diagram of a DVS pose-estimation system 100 according to the subject matter disclosed herein. The system 100 includes a DVS 101, a frame shaper 102, a transform estimator 103, a camera-pose estimator 104, a inertial movement unit (IMU) 105 and an integrator 106. It should be understood that the various blocks depicted in FIG. 1 may be embodied as physical hardware modules, software modules or a combination of physical hardware modules and software modules (firmware).

The DVS 101 detects DVS events within a field of view of the DVS 101. The field of view of the DVS 101 may be modeled by camera-projection model π for the DVS 101. The DVS 101 outputs a DVS event datastream 107 to a frame shaper 102. The DVS datastream 107 includes a stream of events in which each event is associated with a particular state, i.e., the event location within an image sensor array and a binary state indicating a positive or a negative change in luminance.

The frame shaper 102 receives frame selection information 108 that sets a frame-integration time that is applied to the DVS event datastream 107. As used herein, the term "frame-integration time" refers to a selectable period of time over which DVS events are collected and associated together to form a frame. For example, in one embodiment a frame-integration time of 50 ms may be selected and DVS events are collected during each 50 ms period of time and associated together as being in the same frame. In another embodiment, a frame-integration time of 100 ms may be selected and DVS events are collected during each 100 ms period of time and associated together as being in the same frame. It should be understood that frame-integration times are possible that are different from 50 ms or 100 ms. Additionally, in one embodiment, at least two frame-integration times may be simultaneously selected.

Figure 2:
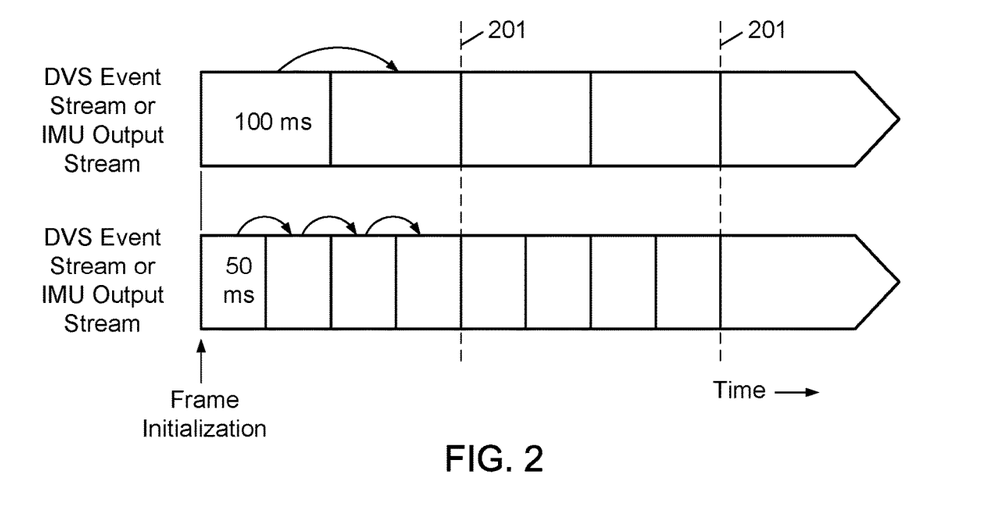
FIG. 2 depicts two example simultaneous frame-integration times for the same DVS event stream or the same inertial measurement unit output data stream according to the subject matter disclosed herein.

FIG. 2 depicts two example simultaneous frame-integration times for the same DVS event stream or the same IMU output data stream according to the subject matter disclosed herein. As depicted in FIG. 2, a frame-integration time of 50 ms and a frame-integration time of 100 ms may be simultaneously selected, and DVS events (and/or IMU output data) are simultaneously associated with the frames corresponding to the two frame-integration times. In other embodiments, more than two simultaneous frame-integration times may be selected.

The frame shaper 102 outputs the frames of the DVS events to the transformation estimator 103 for each frame-integration time that has been selected. The transformation estimator 103 estimates a transformation of DVS events from one frame to the next frame for each frame-integration time that has been selected. As part of the estimation process, the transformation estimator 103 generates a confidence map within the camera-projection model π for the DVS 101 based on a temporal correlation among detected events from one frame to the next frame. A confidence level value $C_u$ is determined for each detected DVS event u in a frame k with respect to each detected DVS event u in a previous frame k−1 that represents a degree of confidence that the event u in the frame k physically corresponds to an event u in the previous frame k−1.

Figure 3:
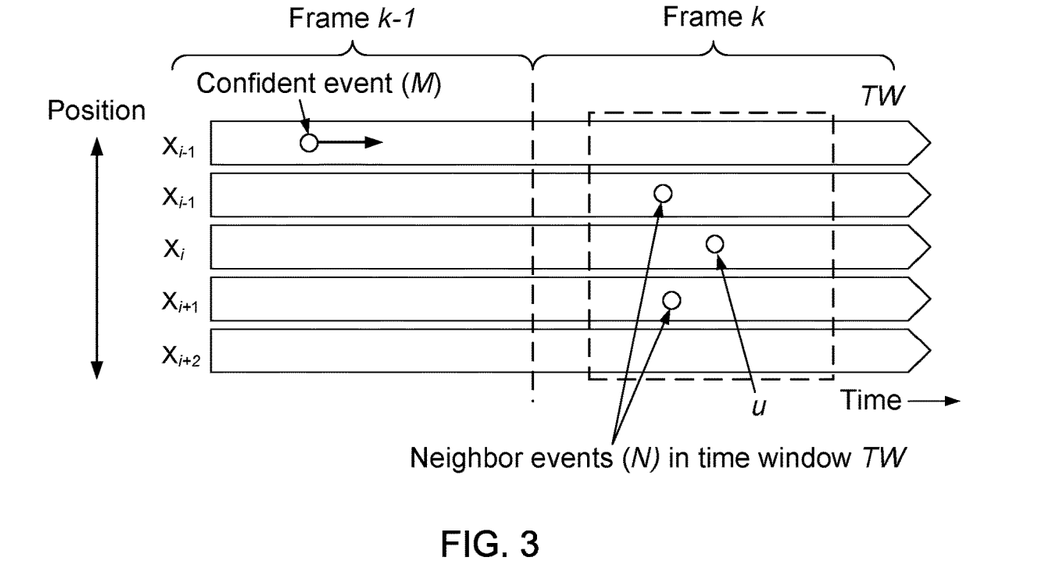
FIG. 3 depicts how a confidence level value $C_u$ may be determined in one embodiment.

FIG. 3 depicts how the confidence level value $C_u$ may be determined in one embodiment. For an event u within a current frame k, $$C_u = N + \alpha M,$$

in which N is the number of events that appear in the neighborhood of event u within a time window TW in the current frame k, M is the number of previous events that were determined to be confident in the previous frame k−1, and α may be a constant, may be dependent on a time interval, or may be frame dependent. If $C_u$ is greater than or equal to a predetermined threshold, then the event u is determined to be a confident event having the confidence level value $C_u = N + \alpha M$.

In one embodiment, the transformation estimator 103 estimates the transformation of the detected events in a pair of temporally consecutive frames based on $$\arg\min \frac{1}{2} \sum_i C_{u_i} \|I_k(\pi(T_{k,k-1} \cdot \pi^{-1}(u_i, d_{u_i}))) - I_{k-1}(u_i)\|^2$$

in which i is an index, u is a detected DVS event, $C_{u_i}$ is a confidence-level value (scalar) for the DVS event $u_i$, I is a frame, k is a frame index, π is the camera-projection model for the DVS, $\pi^{-1}$ is the inverse of the camera-projection model for the DVS, $u_i$ is a vector corresponding to the detected event $u_i$ within the camera-projection model π, $d_{u_i}$ is the (3D) depth of the DVS event $u_i$ in world coordinates, and $T_{k,k-1}$ is one of a plurality of possible vector transformations based on world coordinates between frame $I_{k-1}$ and frame $I_k$. The transformation model estimates a 3D transformation (i.e., $T_{k,k-1}$) of a camera based on the depth $d_{u_i}$ and matching of confident events $C_{u_i}$ in camera projection model π. The camera-projection model includes a transformation matrix to project 3D world points to locations in frame, but the transformation matrix of the camera-projection model may be prefixed at the time of camera calibration and will not change through camera movement. Thus, the camera-projection transformation is different from the transformation estimated for a camera moving from one frame to the next.

The transformation estimator 103 estimates a transformation for each pair temporally consecutive frames for each event stream having a different frame-integration time. That is, if only one frame-integration time has been selected, then the transformation estimator 103 estimates a transformation for each pair of temporally consecutive frames in the one event stream received by the transformation estimator 103. If two or more frame-integration times have been selected, then the transformation estimator 103 estimates a transformation for each pair of temporally consecutive frames for each event stream corresponding to a selected frame-integration time.

Figure 4:
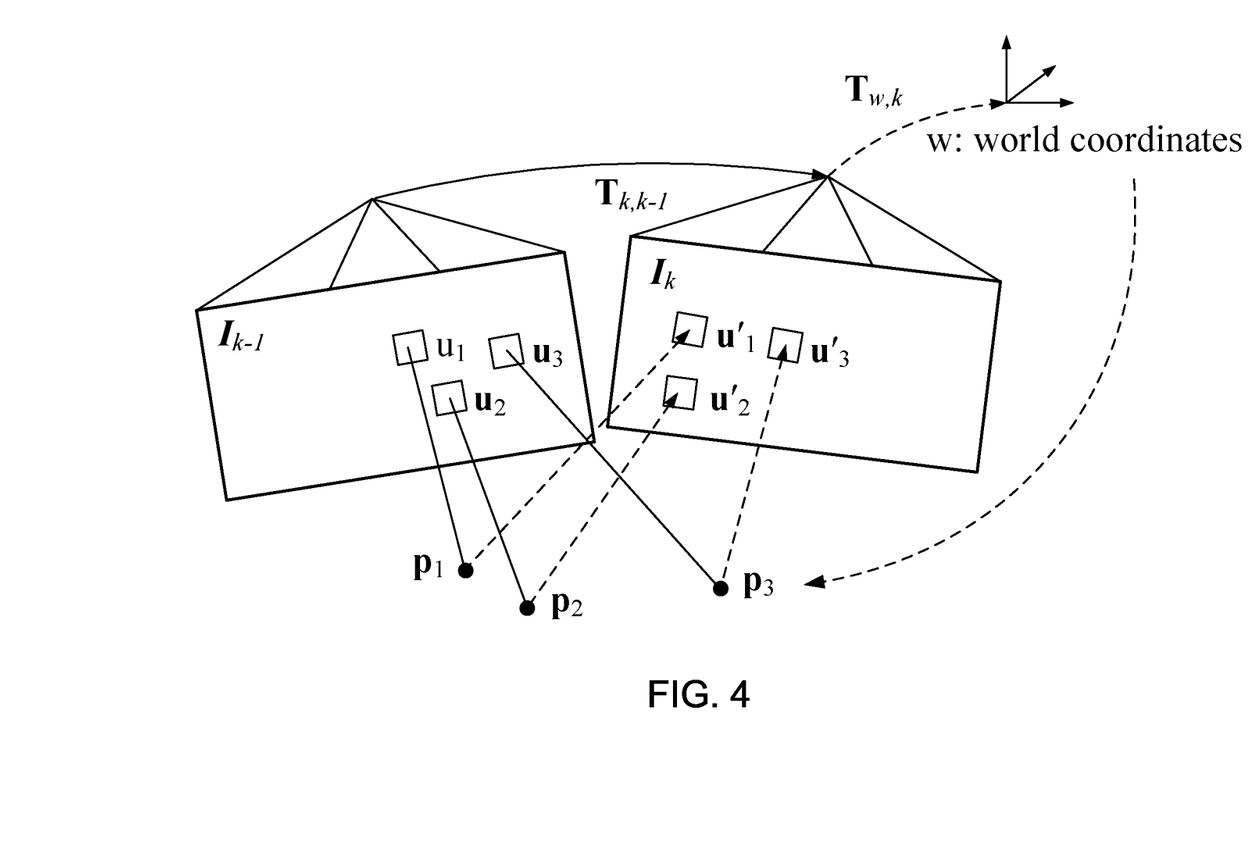
FIG. 4 depicts an example process of estimating a DVS camera pose according to the subject matter disclosed herein.

The transformation estimator 103 outputs the estimated transformation(s) to the camera-pose estimator 104. In one embodiment, the camera-pose estimator 104 uses the estimated transformation(s) to estimate the camera pose in alignment with respect to the map in world coordinates instead of aligning the camera pose based on the previous frame. If two or more frame-integration times have been selected, the camera-pose estimator 104 estimates a camera pose for each respective event stream having a different frame-integration time. FIG. 4 depicts an example process of estimating a DVS camera pose according to the subject matter disclosed herein. In FIG. 4, a current frame $I_k$ and a previous frame $I_{k-1}$ are depicted as including DVS events u that have been determined to have a high confidence level. That is, DVS events $u_1$, $u_2$ and $u_3$ in frame $I_{k-1}$ respectively have a high confidence level value with DVS events $u_1'$, $u_2'$ and $u_3'$ in frame $I_k$. A transformation $T_{k,k-1}$ is determined between the frame $I_{k-1}$, and the frame $I_k$. The transformation $T_{k,k-1}$ is used to map the events to world coordinates, which are then used to estimate the camera pose $p_1$, $p_2$ and $p_3$ based on the world coordinates.

Referring back to FIG. 1, the IMU 105 may be physically coupled to the DVS 101 so that the IMU 105 detects inertial movements of the DVS 101. The output of the IMU 105 is integrated by an integrator 106 that uses the same frame-integration time(s) and is in synchronization with the frame-integration time(s) used by the frame shaper 102. If more than one frame-integration time has been selected by the frame selection information 108, the integrator 106 simultaneously integrates the output of the IMU 105 for each selected frame-integration time. (See, for example, FIG. 2.)

In one embodiment, the camera-pose estimator 104 receives the estimated transformation from the transformation estimator 103 and the output from the integrator 106, and the camera-pose estimator 104 may correct or update the estimated pose for the DVS using the output received from the integrated IMU 105. In one embodiment, the camera-pose estimator 105 may also use the output received from the integrator 106 to estimate a position and/or movement of the DVS based on the received estimated transformation and the received output from the integrator 106.

In another embodiment, the camera-pose estimator 104 may correct, or update, estimated poses using two estimated transformations that were generated based on two different frame-integration times. That is, the camera-pose estimator 104 may correct, or update, an estimated pose that is based on an transformation that is based on a relatively longer frame-integration time, such as a 100 ms frame-integration time, using an estimated transformation that is based on a relatively shorter frame-integration time, such as 50 ms. For example, the camera-pose estimator 104 may correct, or update, every second estimated pose that is based on a 100 ms frame-integration time using every fourth estimated pose that is based on a 50 ms integration time. (See, for example, dashed lines 201 in FIG. 2.) In another embodiment, the camera-pose estimator 104 may correct, or update, an estimated pose, an estimated position and/or an estimated movement of the DVS from received transformations and from the output received from the integrator 106 that are based on a relatively longer frame-integration time, such as a 100 ms frame-integration time, using received transformations and the output received from the integrator 106 that are based on a relatively shorter frame-integration time, such as 50 ms. (See, for example, FIG. 2.)

Figure 5:
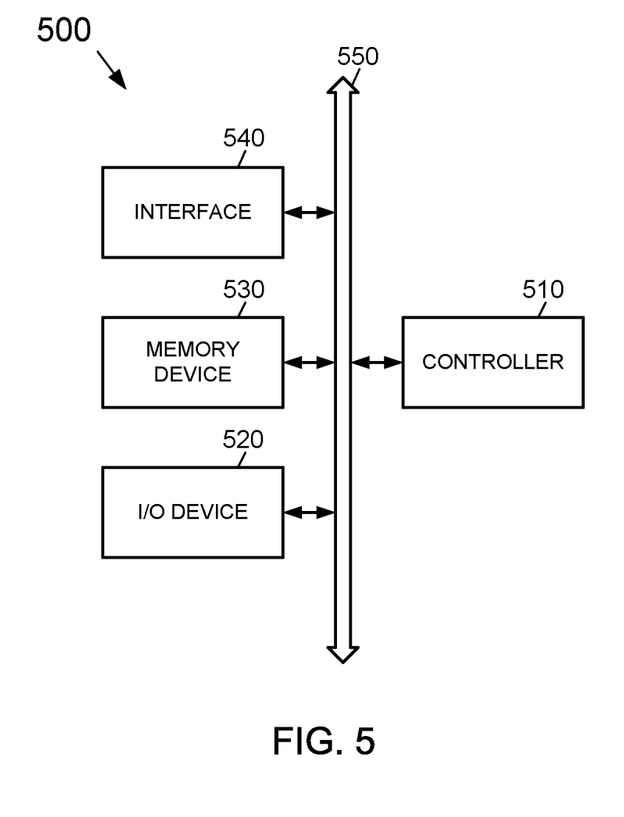
FIG. 5 depicts an electronic device that comprises one or more integrated circuits (chips) comprising a DVS pose-estimation system according to the subject matter disclosed herein.

FIG. 5 depicts an electronic device 500 that comprises one or more integrated circuits (chips) comprising a DVS pose-estimation system according to the subject matter disclosed herein. Electronic device 500 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 500 may comprise a controller 510, an input/output device 520 such as, but not limited to, a keypad, a keyboard, a display, or a touch-screen display, a memory 530, and a wireless interface 540 that are coupled to each other through a bus 550. The controller 510 may comprise, for example, at least one microprocessor, at least one digital signal process, at least one microcontroller, or the like. The memory 530 may be configured to store a command code to be used by the controller 510 or a user data. Electronic device 500 and the various system components comprising electronic device 500 may comprise a DVS pose-estimation system according to the subject matter disclosed herein. The electronic device 500 may use a wireless interface 540 configured to transmit data to or receive data from a wireless communication network using a RF signal. The wireless interface 540 may include, for example, an antenna, a wireless transceiver and so on. The electronic system 500 may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Figure 6:
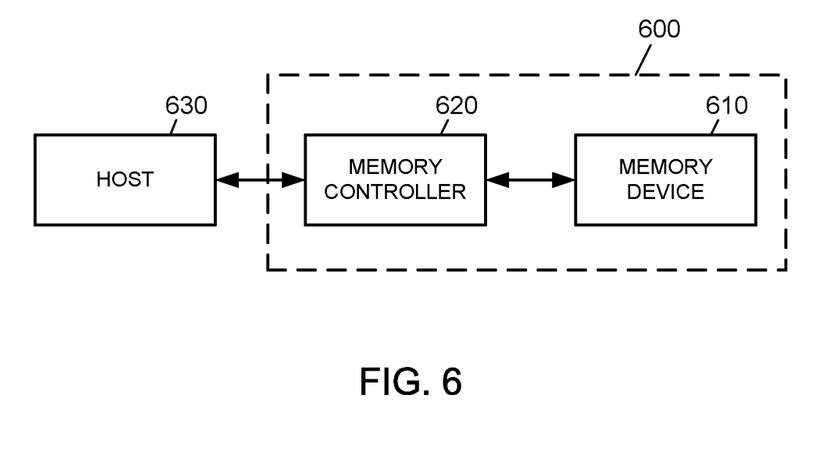
FIG. 6 depicts a memory system that may comprise a DVS pose-estimation system according to the subject matter disclosed herein.

FIG. 6 depicts a memory system 600 that may comprise a DVS pose-estimation system according to the subject matter disclosed herein. The memory system 600 may comprise a memory device 610 for storing large amounts of data and a memory controller 520. The memory controller 620 controls the memory device 610 to read data stored in the memory device 610 or to write data into the memory device 610 in response to a read/write request of a host 630. The memory controller 620 may include an address-mapping table for mapping an address provided from the host 630 (e.g., a mobile device or a computer system) into a physical address of the memory device 610. The memory device 610 may comprise one or more semiconductor devices comprising a DVS pose-estimation system according to the subject matter disclosed herein.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A Dynamic Vision Sensor (DVS) pose-estimation system, comprising:
a DVS to detect DVS events and to shape frames based on accumulated DVS events;
a transformation estimator to estimate a transformation of a camera, of the DVS based on an estimated depth and to match confidence-level values within a camera-projection model such that a DVS event detected during a first frame corresponds to a DVS event detected during a second frame, the second frame being subsequent to the first frame, the transformation estimator estimating the transformation based on a minimum of a quantity formed by a square of a distance between a vector of the DVS event detected in the first frame and a dot product of a vector of the DVS event in the second frame and a vector transformation based on world coordinates between the first frame and the second frame multiplied by a scalar confidence-level value for the DVS event detected in the first frame;
an inertial measurement unit (IMU) to detect inertial movements of the DVS with respect to world coordinates between the first and second frames; and
a camera-pose estimator to estimate a change in a pose of the DVS camera between the first frame and the second frame based on the estimated transformation and the detected inertial movements of the DVS.

2. The system of claim 1, wherein the camera-pose estimator uses the detected inertial movements of the DVS to correct the estimated change in a pose of a transformation model between the first frame and the second frame based on the estimated transformation.

3. The system of claim 1, wherein the transformation estimator estimates the transformation of the DVS camera for first and second frames for a plurality of frame-integration times, and
wherein the camera-pose estimator corrects a first estimate in the change in a pose of the DVS camera between the first frame and the second frame corresponding to a first frame-integration time based on an estimate in the change in the pose of the DVS camera between the first frame and the second frame corresponding to a second frame-integration time, the first frame-integration time being longer than the second frame-integration time.

4. The system of claim 1, wherein the transformation estimator estimates the transformation of the DVS camera for first and second frames for a plurality of frame-integration times, and
wherein the IMU detects inertial movements of the DVS with respect to world coordinates between the first and second frames for each of the plurality of frame-integration times.

5. The system according to claim 1, wherein the transformation estimator further estimates the transformation based on $$\arg\min \frac{1}{2} \sum_i C_{u_i} \| I_k(\pi(T_{k,k-1} \cdot \pi^{-1}(u_i, d_{u_i}))) - I_{k-1}(u_i) \|^2$$

in which i is an index, u is a detected DVS event, $C_{u_i}$ is the scalar confidence-level value for a DVS event $u_i$, I is a frame, k is a frame index, $\pi$ is a camera-projection model for the DVS, $\pi^{-1}$ is an inverse of the camera-projection model $\pi$ for the DVS, $u_i$ is a vector corresponding to a detected event $u_i$ within the camera-projection model $\pi$, $d_{u_i}$ is a three-dimensional depth of the DVS event $u_i$ in world coordinates, and $T_{k,k-1}$ is one of a plurality of possible vector transformations based on world coordinates between frame $I_{k-1}$ and frame $I_k$.

6. The system of claim 5, wherein the camera-pose estimator uses the detected inertial movements of the DVS to make corrections to the estimated change in the pose of the camera-projection model for the DVS between the first frame and the second frame based on the estimated transformation.

7. The system of claim 5, wherein the transformation estimator estimates the transformation of the DVS camera for first and second frames for a plurality of frame-integration times, and
wherein the camera-pose estimator corrects an estimate in the change in a pose of the DVS camera between the first frame and the second frame corresponding to a first integration time based on an estimate in the change in a pose of the DVS camera between the first frame and the second frame corresponding to a second integration time, the first integration time being longer than the second integration time.

8. The system of claim 5, wherein the transformation estimator estimates the transformation of the DVS camera for first and second frames for a plurality of frame-integration times, and
wherein the IMU detects inertial movements of the DVS with respect to the world coordinates between the first and second frames for each of the plurality of frame-integration times.

9. A method to estimate a pose of a camera for a dynamic vision sensor (DVS), the method comprising:
detecting DVS events and shaping frames from accumulated DVS events;
estimating a transformation of the camera based on an estimated depth and matching confidence-level values within a camera-projection model such that at least one of a plurality of DVS events detected during a first frame corresponds to a DVS event detected during a second frame, the second frame being subsequent to the first frame, the estimating of the transformation comprising estimating the transformation based on a minimum of a quantity formed by a square of a distance between a vector of the DVS event detected in the first frame and a dot product of a vector of the DVS event in the second frame and a vector transformation based on world coordinates between the first frame and the second frame multiplied by a scalar confidence-level value for the DVS event detected in the first frame;
detecting inertial movements of the DVS with respect to world coordinates between the first and second frames; and
estimating a change in a pose of the camera between the first frame and the second frame based on the estimated transformation and the detected inertial movements of the DVS.

10. The method of claim 9, further comprising correcting the estimated change in the pose of the camera between the first frame and the second frame generated based on the estimated transformation using the detected inertial movements of the DVS.

11. The method of claim 9, wherein estimating the transformation of the camera for first and second frames comprises estimating a transformation of the camera for a plurality of frame-integration times,
the method further comprising:
correcting an estimate in the change in a pose of the camera between the first frame and the second frame corresponding to a first frame-integration time based on an estimate in the change in a pose of the camera between the first frame and the second frame corresponding to a second frame-integration time, the first frame-integration time being longer than the second frame-integration time.

12. The method of claim 9, wherein estimating the transformation of the camera comprises estimating the transformation of the camera for first and second frames for a plurality of frame-integration times, and
wherein detecting the inertial movements of the DVS comprises detecting inertial movements of the DVS with respect to world coordinates between the first and second frames for each of the plurality of frame-integration times.

13. The method of claim 9, wherein estimating the transformation further comprises estimating the transformation based on $$\arg\min \frac{1}{2} \sum_i C_{u_i} \| I_k(\pi(T_{k,k-1} \cdot \pi^{-1}(u_i, d_{u_i}))) - I_{k-1}(u_i) \|^2$$

in which i is an index, u is a detected DVS event, $C_{u_i}$ is a scalar confidence-level value for a DVS event $u_i$, I is a frame, k is a frame index, $\pi$ is a camera-projection model for the DVS, $\pi^{-1}$ is an inverse of the camera-projection model $\pi$ for the DVS, $u_i$ is a vector corresponding to a detected event $u_i$ within the camera-projection model $\pi$, $d_{u_i}$ is a three-dimensional depth of the DVS event $u_i$ in world coordinates, and $T_{k,k-1}$ is one of a plurality of possible vector transformations based on world coordinates between frame $I_{k-1}$, and frame $I_k$.

14. The method of claim 13, further comprising correcting the estimated change in the pose of the camera between the first frame and the second frame based on the estimated transformation using the detected inertial movements of the DVS.

15. The method of claim 13, wherein estimating the transformation of the camera comprises estimating the transformation of the camera for first and second frames for a plurality of frame-integration times,
the method further comprising:
correcting an estimate in the change in a pose of the camera between the first frame and the second frame corresponding to a first integration time based on an estimate in the change in a pose of the camera between the first frame and the second frame corresponding to a second integration time, the first integration time being longer than the second integration time.

16. The method of claim 13, wherein estimating the transformation of a camera-projection model comprises estimating the transformation of the camera for first and second frames for a plurality of frame-integration times, and
wherein detecting the inertial movements of the DVS comprises detecting inertial movements of the DVS with respect to the world coordinates between the first and second frames for each of the plurality of frame-integration times.

17. A Dynamic Vision Sensor (DVS) pose-estimation system, comprising:
a DVS to detect DVS events and to shape frames based on a number of accumulated events;
a transformation estimator to estimate a transformation of a camera of the DVS based on an estimated depth and to match confidence-level values within a camera-projection model such that at least one of a plurality of DVS events detected during a first frame corresponds to a DVS event detected during a second frame for at least two frame-integration times, the second frame being subsequent to the first frame for each frame-integration time, the transformation estimator estimating the transformation for each frame-integration time based on a minimum of a quantity formed by a square of a distance between a vector of the DVS event detected in the first frame and a dot product of a vector of the DVS event in the second frame and a vector transformation based on world coordinates between the first frame and the second frame multiplied by a scalar confidence-level value for the DVS event detected in the first frame; and
a camera-pose estimator to estimate a change in a pose of the camera between the first frame and the second frame for the at least two of frame-integration times based on the estimated transformation the camera-pose estimator further to correct the estimate in the change in the pose of the camera between the first frame and the second frame for a first frame-integration time based on an estimate in the change in the pose of the camera between the first frame and the second frame for a second frame-integration time, the first frame-integration time being longer than the second frame-integration time.

18. The system of claim 17, further comprising an inertial measurement unit (IMU) to detect inertial movements of the DVS with respect to world coordinates between the first and second frames for each of the at least two frame-integration times,
wherein the camera-pose estimator further estimates the change in a pose of the camera between the first frame and the second frame for the at least two frame-integration times based on the estimated transformation and the detected inertial movements of the DVS.

19. The system of claim 18, wherein the camera-pose estimator further corrects the estimated change in the pose of the camera between the first frame and the second frame generated based on the estimated transformation for each frame-integration time using the detected inertial movements of the DVS.

20. The system according to claim 17, wherein the transformation estimator further estimates the transformation for each frame-integration time based on $$\arg\min \frac{1}{2} \sum_i C_{u_i} \| I_k(\pi(T_{k,k-1} \cdot \pi^{-1}(u_i, d_{u_i}))) - I_{k-1}(u_i) \|^2$$

in which i is an index, u is a detected DVS event, $C_{u_i}$ is a scalar confidence-level value for a DVS event $u_i$, I is a frame, k is a frame index, $\pi$ is a camera-projection model for the DVS, $\pi^{-1}$ is an inverse of the camera-projection model $\pi$ for the DVS, $u_i$ is a vector corresponding to a detected event $u_i$ within the camera-projection model $\pi$, $d_{u_i}$ is a three-dimensional depth of the DVS event $u_i$ in world coordinates, and $T_{k,k-1}$ is one of a plurality of possible vector transformations based on world coordinates between frame $I_{k-1}$, and frame $I_k$.

\* \* \* \* \*